(12) United States Patent
Akashi et al.

(10) Patent No.: US 6,252,782 B1
(45) Date of Patent: Jun. 26, 2001

(54) SWITCHING POWER SUPPLY UTILIZING MAGNETICALLY COUPLED SERIES INDUCTORS

(75) Inventors: Hiroki Akashi; Toshikazu Nagaki, both of Hirakata (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 0 days.

(21) Appl. No.: 09/456,091

(22) Filed: Dec. 6, 1999

(30) Foreign Application Priority Data

Dec. 8, 1998 (JP) .................................................. 10-348954

(51) Int. Cl.[7] .................................................. H02M 3/335
(52) U.S. Cl. ...................................... 363/17; 363/132
(58) Field of Search ............................... 363/17, 98, 132

(56) References Cited

U.S. PATENT DOCUMENTS

| | | | |
|---|---|---|---|
| 4,737,974 | 4/1988 | Hino et al. | 378/105 |
| 4,860,189 | 8/1989 | Hitchcock | 363/132 |
| 4,864,479 | 9/1989 | Steigerwald et al. | 363/17 |
| 5,198,969 | 3/1993 | Redl et al. | 363/17 |
| 5,438,498 * | 8/1995 | Ingemi | 363/17 |
| 5,546,294 * | 8/1996 | Schutten et al. | 363/98 |
| 5,568,373 | 10/1996 | Small | 363/132 |
| 5,875,103 * | 2/1999 | Bhagwat et al. | 363/98 |
| 5,880,944 * | 3/1999 | Hickman | 363/17 |
| 5,963,436 * | 10/1999 | Yoshida | 363/132 |

FOREIGN PATENT DOCUMENTS

| | | | |
|---|---|---|---|
| 5-20991 | 3/1993 | (JP) | H02M/3/28 |
| 9-191642 | 7/1997 | (JP) | H02M/3/335 |
| 11-89232 | 3/1999 | (JP) | H02M/3/335 |

* cited by examiner

Primary Examiner—Jeffrey Sterrett
(74) Attorney, Agent, or Firm—Sheridan Ross P.C.

(57) ABSTRACT

In a switching power supply apparatus, two mutually coupled inductors 41a, 41b are connected to both ends of a primary winding of a transformer, and a pair of switching units 21, 22 and a pair of switching units 23, 24 are connected to the other ends of the inductors 41a, 41b, respectively, while two diodes 51, 52 are connected at one end to both ends of the primary winding of the transformer and at the other end to a power supply, wherein the pair of switching units 21, 22 and the pair of switching units 23, 24 each constitute a series circuit in which the two switching means alternately turn on and off with a dead time period between the turning off of one switching unit and the turning on of the other switching unit, and wherein a voltage phase difference at a connection point between the two series circuits is 180° and the duty ratio of each of switching units is controlled.

22 Claims, 7 Drawing Sheets

(a)

(b)

SWITCHING POWER SUPPLY UTILIZING MAGNETICALLY COUPLED SERIES INDUCTORS

BACKGROUND OF THE INVENTION

The present invention relates to a switching power supply apparatus for supplying a regulated dc voltage to an industrial or consumer electronic appliance.

In recent years, the demand has been increasing greatly for switching power supply apparatus which is smaller in size, more stable in output and higher in efficiency, as electronic appliances decrease in size, price, high performance and power-conserving design advances.

As an example of a prior art switching power supply apparatus that addresses such requirements, a full bridge converter will be elucidated with reference to FIG. 6. The drawing of FIG. 6 is a circuit diagram showing the configuration of the prior art full bridge converter.

In FIG. 6, an input dc power supply 111 is connected between input terminals 112a and 112b. A first switching device 121a and a second switching device 122a are connected in series between the input terminals 112a and 112b, and are turned on alternately, with a duty ratio below 50% interleaving therebetween, by control signals supplied from a control circuit 171. A third switching device 123a and a fourth switching device 124a are connected in series between the input terminals 112a and 112b. The third switching device 123a is controlled so as to turn on and off repetitively with the same timing as the second switching device 122a. The fourth switching device 124a is controlled so as to turn on and off repetitively with the same timing as the first switching device 121a.

A parasitic capacitor is formed in parallel with each of the first switching device 121a, second switching device 122a, third switching device 123a, and fourth switching device 124a. In FIG. 6, the respective parasitic capacitors are shown as capacitors 121c, 122c, 123c, and 124c.

A transformer 131 has a primary winding 131a, a first secondary winding 131b, and a second secondary winding 131c. The turns ratio of the primary winding 131a, the first secondary winding 131b, and the second secondary winding 131c is n:1:1. A first terminal of the primary winding 131a of the transformer 131 is connected to a connection point between the first switching device 121a and the second switching device 122a. A second terminal of the primary winding 131a of the transformer 131 is connected to a connection point between the third switching device 123a and the fourth switching device 124a.

The operation of the prior art full bridge converter will be described below with reference to FIG. 7. The drawing of FIG. 7 is a waveform diagram for explaining the operation of the full bridge converter according to the prior art.

In FIG. 7, G1, G2, G3, and G4 are the control signals supplied to the first to fourth switching devices 121a, 122a, 123a, and 124a, respectively.

In FIG. 7, V122 indicates the voltage applied to the second switching device 122a, V124 indicates the voltage applied to the fourth switching device 124a, and V131a the voltage applied to the primary winding 131a of the transformer 131.

In FIG. 7, I131a indicates the current flowing in the primary winding 131a of the transformer 131, I121 indicates the current flowing in the parallel circuit consisting of the first switching device 121a and the capacitor 121c. And, the waveform of I122 represents the current flowing in the parallel circuit consisting of the second switching device 122a and the capacitor 122c. To indicate the variation over time of the operating condition, time is plotted on a time scale of T0 to T4 in FIG. 7.

At time T0, when the first switching device 121a and the fourth switching device 124a are simultaneously turned on by the control signals G1 and G4 from the control circuit 171, the voltage V131a being applied to the primary winding 131a of the transformer 131 becomes the input voltage Vin. Voltage V131b on the first secondary winding 131b of the transformer 131 and voltage V131c on the second secondary winding 131c both becomes a voltage Vin/n.

As a result, a diode 161 is turned on and a diode 162 is turned off, so that voltage V163 across a third inductor 163 is a voltage Vin/n−Vout. Further, the sum of the magnetizing current in the primary winding 131a of the transformer 131 and a primary side converted current of the current flowing in the third inductor 163 flows into the first switching device 121a. The primary side converted current is the component such that a current flowing in the third inductor 163 is converted into the current flowing through the primary winding 131a. However, at time T0, at the instant when the first switching device 121a changes from the OFF state (nonconductive state) with a voltage Vin/2 applied thereto to the ON state (conductive state), the discharging of the capacitor 121c and the charging of the capacitor 122c occur instantaneously. This causes a spike current to flow, as shown with I121 of FIG. 7.

At time T1, when the first switching device 121a and the fourth switching device 124a are simultaneously turned off, the secondary current in the transformer 131 flows being split between the first secondary winding 131b and the second secondary winding 131c so that no discontinuity is caused in the magnetizing energy of the third inductor 163. At this time, the diodes 161 and 162 are both ON, and the voltages V131b and V131c on the first and second secondary windings 131b and 131c both become zero.

The voltage V163 across the third inductor 163 is then a voltage −Vout. Further, at the instant that the first switching device 121a and the fourth switching device 124a are turned off, an unwanted resonant voltage such as shown in V131a in FIG. 7 occurs due to leakage inductance of the transformer or energy stored in inductance parasitizing on wiring.

At time T2, when the second switching device 122a and the third switching device 123a are simultaneously turned on, the voltage V131a being applied to the primary winding 131a of the transformer 131 becomes the voltage −Vin. Then, the voltages V131b and V131c on the first and second secondary windings 131b and 131c of the transformer 131 both become a voltage −Vin/n. As a result, the diode 161 is turned off and the diode 162 is turned on, and the voltage V163 across the third inductor 163 becomes a voltage Vin/n−Vout.

At this time, the sum of the magnetizing current in the primary winding 131a of the transformer 131 and the primary side converted current of the current flowing in the third inductor 163 flows through the second and third switching devices 122a and 123a. The primary converted current is the component such that a current flowing in the third inductor 163 is converted into the current flowing through the primary winding 131a. Further, at time T2, at the instant when the second switching device 122a and the third switching device 123a are simultaneously turned on, spike noise occurs, just as at time T0.

At time T3, when the second switching device 122a and the third switching device 123a are simultaneously turned off, the secondary current in the transformer 131 flows being split between the first secondary winding 131b and the second secondary winding 131c so that no discontinuity is caused in the magnetizing energy of the third inductor 163.

As a result, the diodes 161 and 162 are both turned on, and the voltages V131b and V131c on the first and second secondary windings 131b and 131c both become zero. At this time, the voltage V163 across the third inductor 163 is a voltage −Vout. Further, at time T3, at the instant when the second switching device 122a and the third switching device 123a are simultaneously turned off, an unwanted resonant voltage occurs, just as at time T1.

At time T4, when the first switching device 121a and the fourth switching device 124a are simultaneously turned on, the voltage V131a being applied to the primary winding 131a of the transformer 131 becomes the input voltage Vin. This action is the same as that at time T0, and the operation from time T0 to time T4 is thus performed repeatedly.

The duty ratio of the first to fourth switching devices 121a, 122a, 123a, and 124a are set so that each ON period is equal such that T1−T0=T3−T2=Ton and each OFF period is equal such that T2−T1=T4−T3=Toff. By so setting, if it is assumed that, in steady state operation the magnetic flux of the third inductor 163 is in its initial state when the first switching device 121a is turned on. The following relation (1) holds since the magnetic flux returns to its initial state in one cycle period from the turn-on of the first switching device 121a to the next turn-on thereof.

$$(Vin/n-Vout) \times Ton - Vout \times Toff = 0 \qquad (1)$$

Hence, the output voltage Vout is related to the input voltage Vin by $$Vout = \delta \times Vin/n \qquad (2),$$

where δ in equation (2) is expressed by $$\delta = Ton/(Ton+Toff) \qquad (3).$$

That is, the output voltage Vout can be regulated by adjusting the duty ratio of each of the first to fourth switching devices 121a, 122a, 123a, and 124a.

Since current flows in the first to fourth switching devices 121a, 122a, 123a, and 124a in a balanced manner and thus, stress is distributed, the full bridge converter of the prior art has the feature of being able to be readily applied to large-power handling power supplies despite its compact size.

However, in the above-mentioned prior art full bridge converter, when the first to fourth switching devices 121a, 122a, 123a, and 124a respectively turn on, the charging and discharging of the associated parasitic capacitors occur instantaneously, causing a surge current. The prior art full bridge converter, therefore, has had the problem that power loss and noise are caused by this surge current.

Furthermore, when the first to fourth switching devices 121a, 122a, 123a, and 124a respectively turn off, an unwanted resonant voltage is induced due to leakage inductance of the transformer or parasitic inductance on wiring. This unwanted resonant voltage also has caused power loss and noise in the prior art full bridge converter.

BRIEF SUMMARY OF THE INVENTION

It is an object of the present invention to provide a switching power supply apparatus which achieves high efficiency and low noise performance over a wide load range by reducing the unwanted surge current and resonant voltage associated with parasitic capacitors and leakage inductance.

To achieve the above-mentioned object, the switching power supply apparatus of the present invention comprises:

a first series circuit connected to an input dc power supply and having a first switching means and a second switching means which alternately turn on and off with a dead time period between the turning off of one switching means and the turning on of the other switching means;

a second series circuit connected to the input dc power supply and having a third switching means and a fourth switching means which alternately turn on and off with a dead time period between the turning off of one switching means and the turning on of the other switching means;

a transformer having at least a primary winding and a secondary winding;

a first inductor connected between a first terminal of the primary winding of the transformer and a connection point at which the first switching means and the second switching means are connected;

a second inductor magnetically coupled with the first inductor and connected between a second terminal of the primary winding of the transformer and a connection point at which the third switching means and the fourth switching means are connected;

a first diode connected between the first terminal of the primary winding of the transformer and a negative or positive terminal of the input dc power supply;

a second diode connected between the second terminal of the primary winding of the transformer and the negative or positive terminal, whichever is the same as the terminal to which the first diode is connected;

rectifying and smoothing means for rectifying a voltage induced in the secondary winding of the transformer and smoothing the rectified voltage; and ON/OFF control means for controlling either the duty ratio of a controllable switching device, such as an FET or IGBT, constituting the first switching means or the duty ratio of a controllable switching device, such as an FET or IGBT, constituting the third switching means, or both of the ratios.

According to this switching power supply apparatus, parasitic capacitors having parasitic capacitance in the respective switching means can be charged and discharged using the energy stored in the inductors, allowing each switching device to turn on with its voltage substantially held at zero. This serves to prevent the occurrence of a short-circuit current or to reduce the short-circuit current, and efficiency can thus be improved while suppressing the generation of noise.

When there is a need to accommodate a light load, the inductance values of the inductors are made large to increase the energy to be stored in the inductors so that the parasitic capacitors of the respective switching means can be fully charged and discharged. As a result, the short-circuit current can be prevented from occurring or can be reduced, improving the efficiency and suppressing the generation of noise, as in the foregoing case.

Furthermore, in the present invention, since the two inductors are magnetically coupled together, unwanted resonation does not occur between a parasitic capacitor in the transformer and the added inductors. As a result, high efficiency and low noise performance can be achieved over a wide load range.

In the thus configured switching power supply apparatus, it is desirable that each of the first switching means, second switching means, third switching means, and fourth switching means be constructed of a controllable switching device containing a diode in parallel or of a parallel connection consisting of a controllable switching device and a diode.

While the novel features of the invention are set forth particularly in the appended claims, the invention, both as to organization and content, will be better understood and appreciated, along with other objects and features thereof, from the following detailed description taken in conjunction with the drawings.

Figure 3:
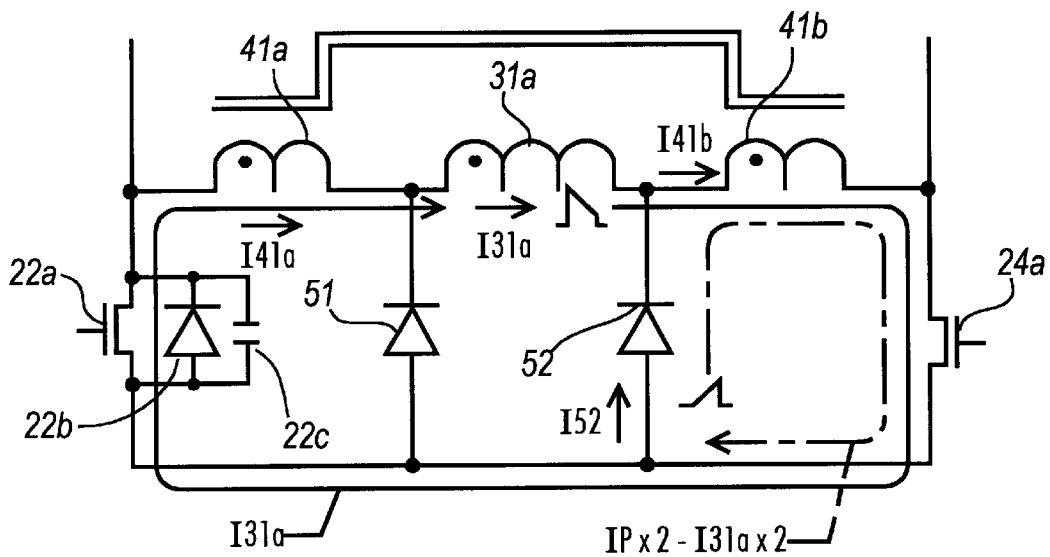
Figure 3:
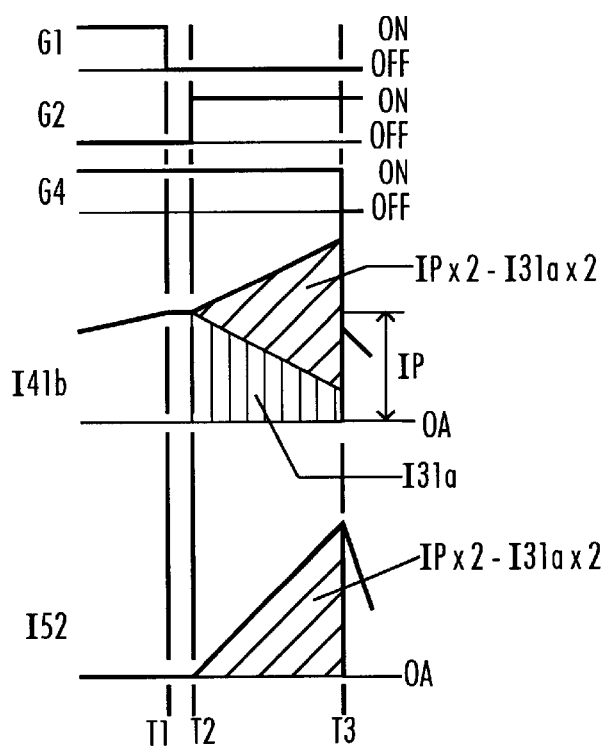
Figure 4:
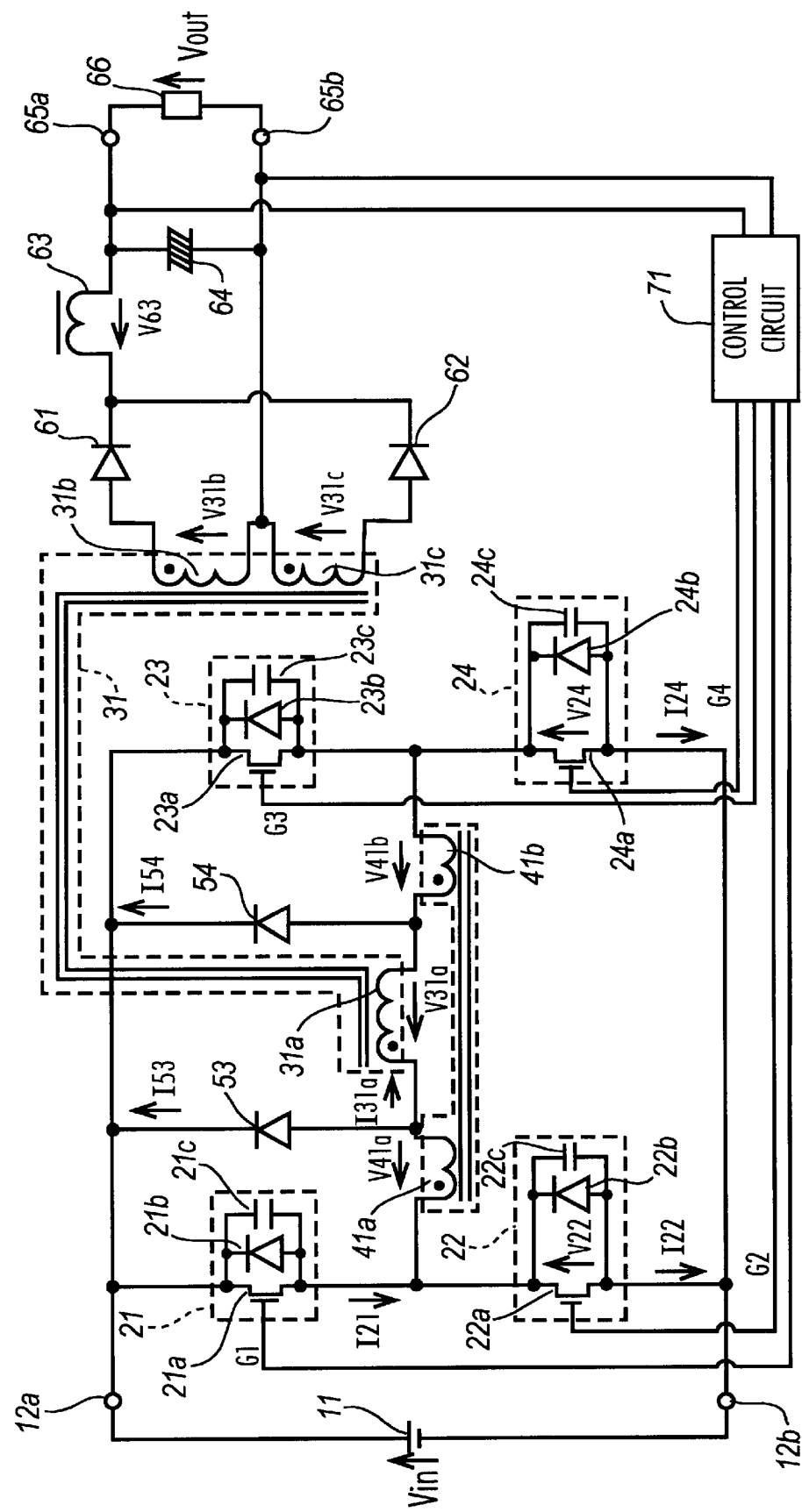
Figure 5:
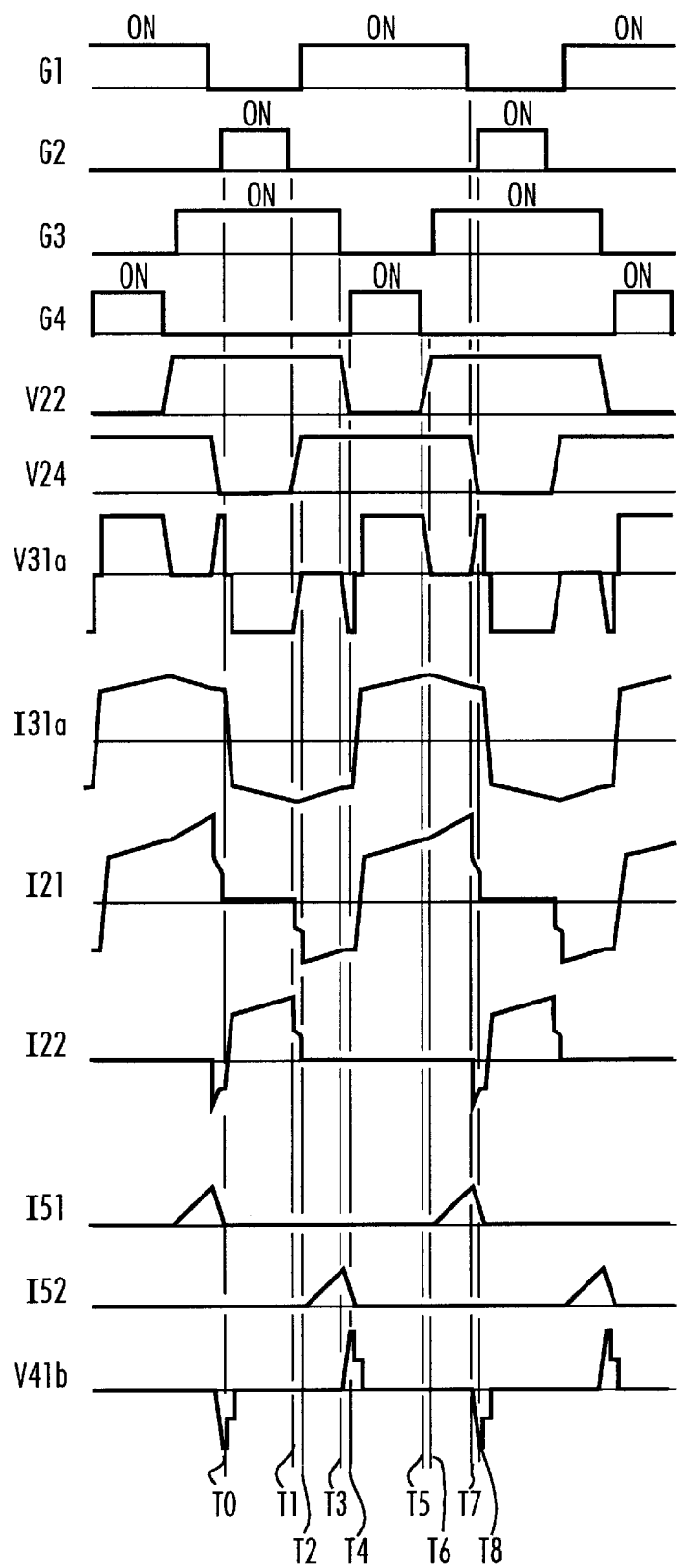
Figure 6:
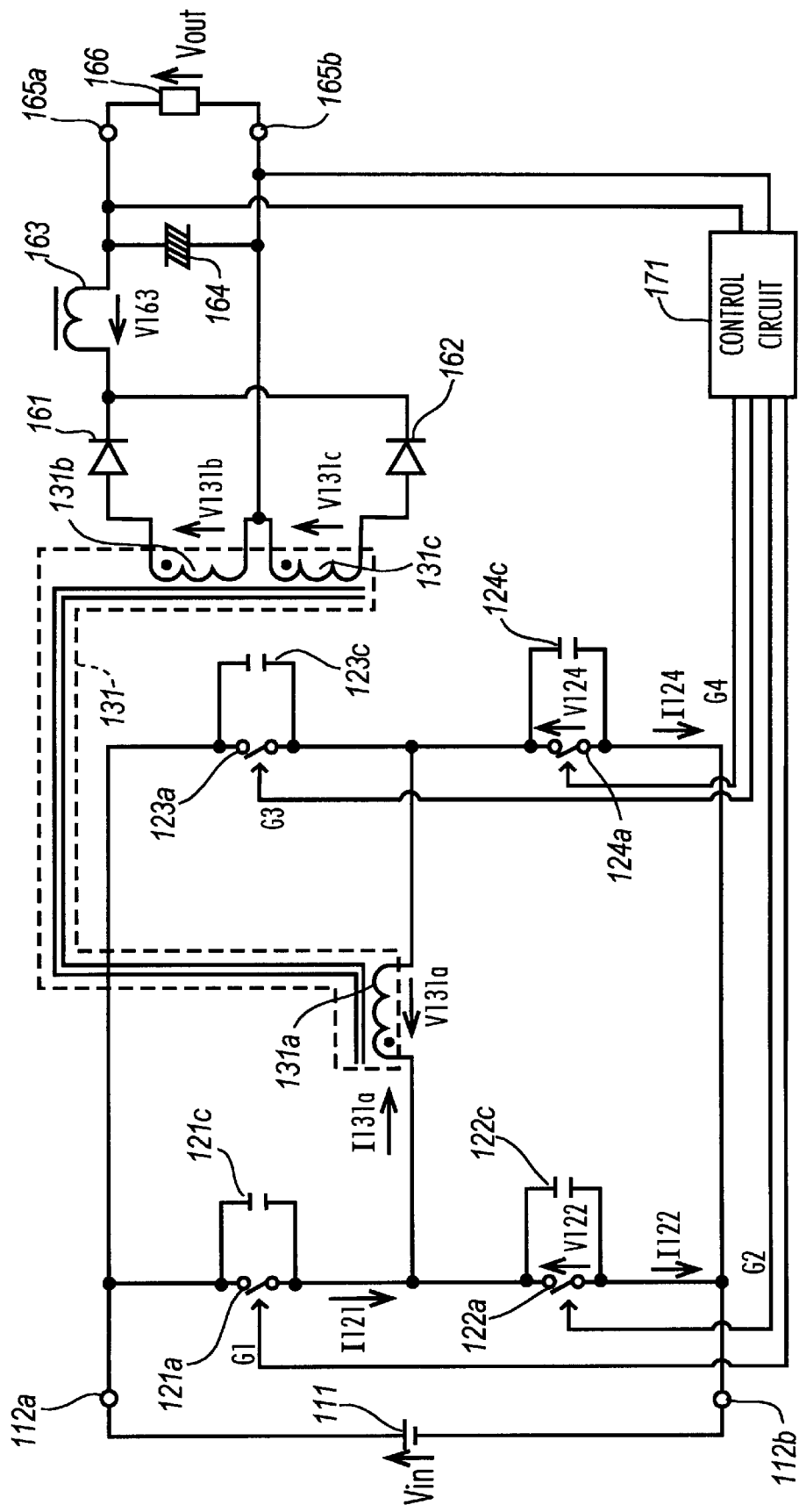
Figure 7:
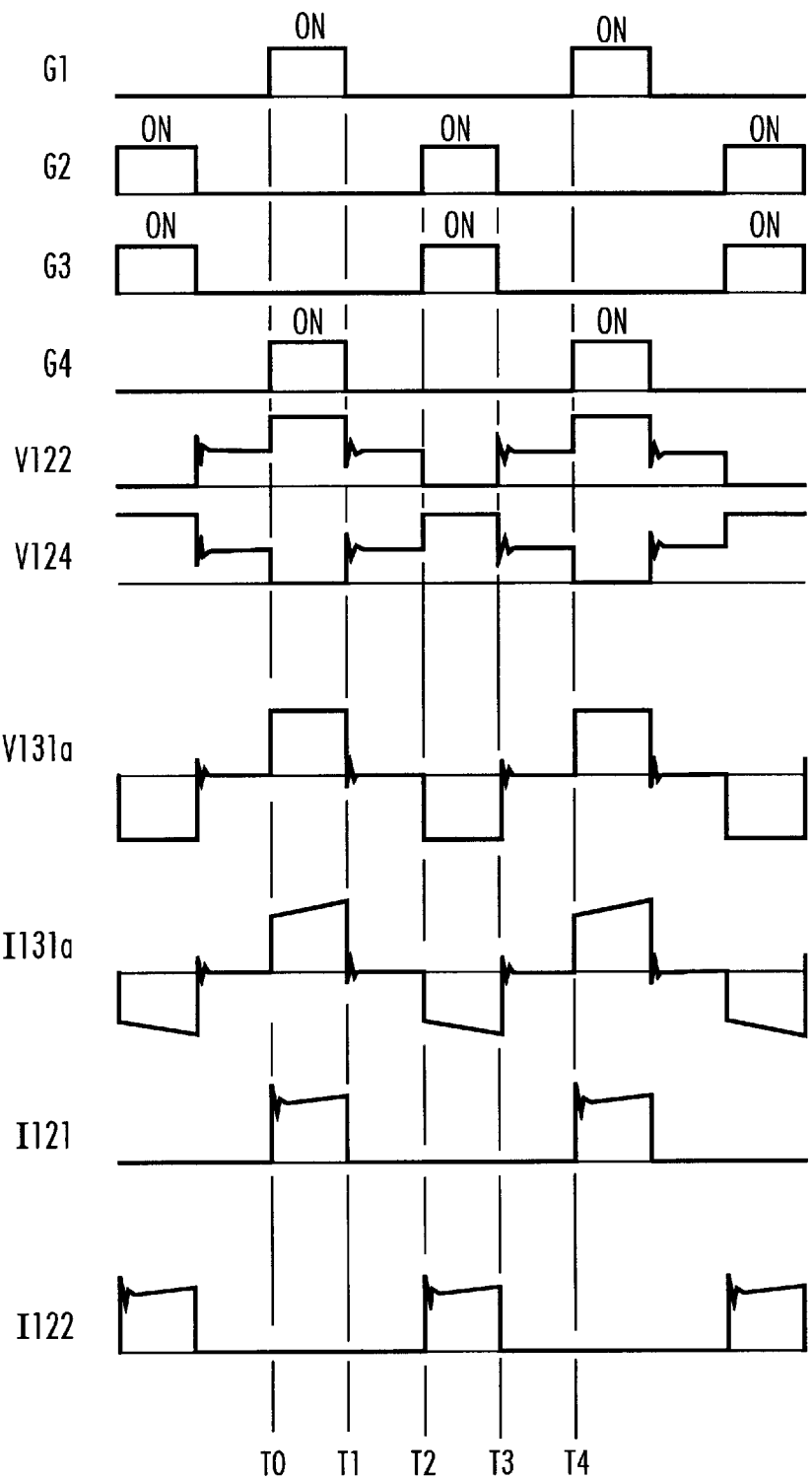

A part (a) of FIG. 3 is an explanatory diagram showing the operation of a first and a second inductor in the switching power supply apparatus according to the first embodiment of the present invention, and a part (b) of FIG. 3 is a waveform diagram showing currents flowing in a second diode and a fourth switching means in the switching power supply apparatus according to the first embodiment of the present invention;

FIG. 4 is a circuit diagram showing the configuration of a switching power supply apparatus according to a second embodiment of the present invention;

FIG. 5 is a waveform diagram illustrating the operation of each part of the switching power supply apparatus according to the second embodiment of the present invention;

FIG. 6 is the circuit diagram showing the configuration of a full bridge converter according to the prior art; and FIG. 7 is the waveform diagram illustrating the operation of each part of the full bridge converter according to the prior art.

It will be recognized that some or all of the Figures are schematic representations for purposes of illustration and do not necessarily depict the actual relative sizes or locations of the elements shown.

DETAILED DESCRIPTION OF THE INVENTION

Preferred embodiments of the switching power supply apparatus according to the present invention will be described below with reference to the accompanying drawings.

Embodiment 1

Figure 1:
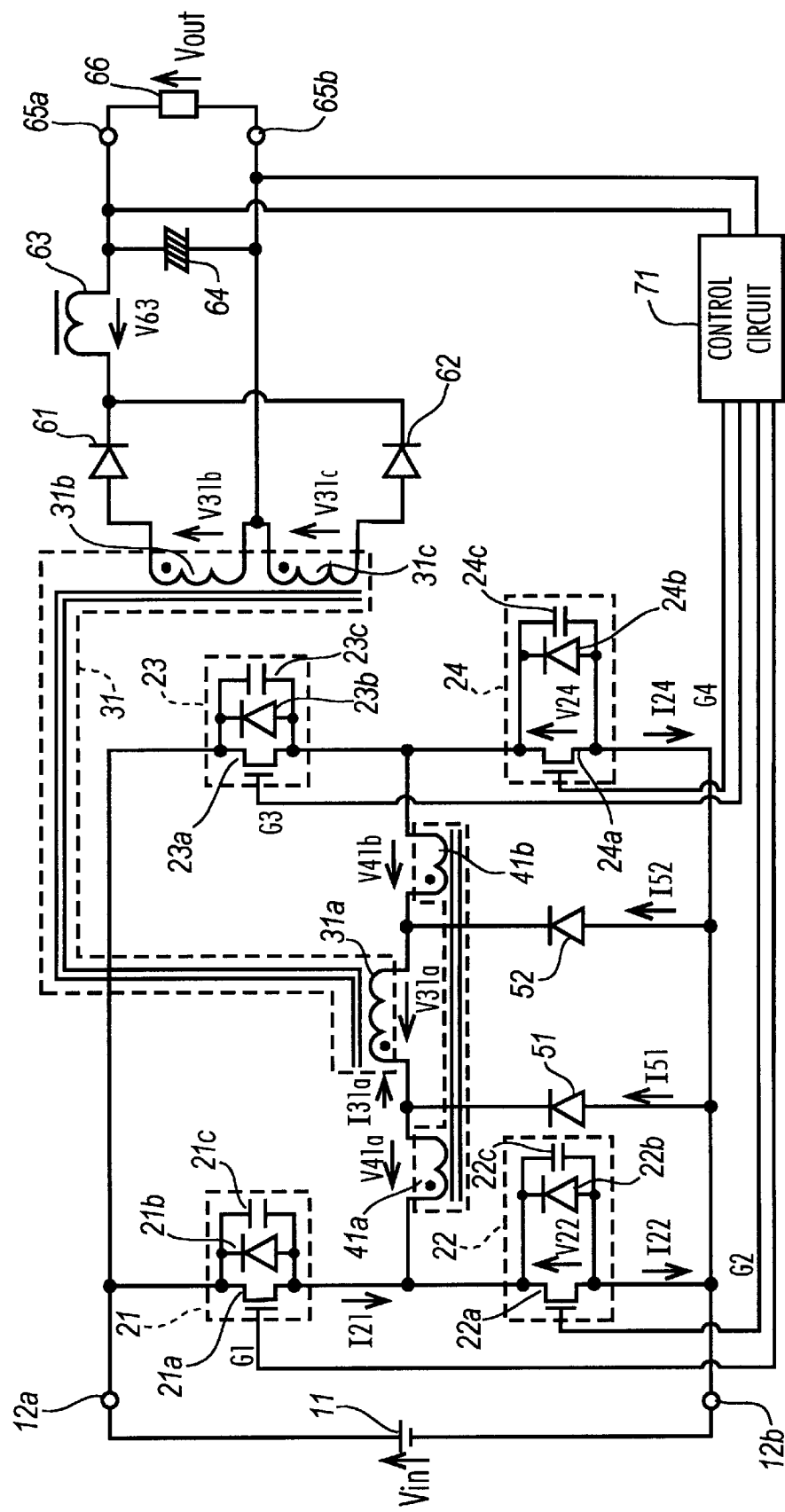
FIG. 1 is a circuit diagram showing the configuration of a switching power supply apparatus according to a first embodiment of the present invention.

A switching power supply apparatus according to a first embodiment of the present invention will be described with reference to FIGS. 1 to 3. FIG. 1 is a circuit diagram showing the configuration of the switching power supply apparatus according to the first embodiment of the present invention.

In FIG. 1, a first switching unit 21 comprises a first switching device 21a, a diode 21b, and a capacitor 21c connected in parallel. The capacitor 21c is a parasitic capacitor having parasitic capacitance in the first switching device 21a and the diode 21b. A second switching unit 22 comprises a second switching device 22a, a diode 22b, and a capacitor 22c connected in parallel. The capacitor 22c is a parasitic capacitor having parasitic capacitance in the second switching device 22a and the diode 22b.

The first switching device 21a and the second switching device 22a are controlled by control signals from a control circuit 71. The first switching device 21a and the second switching device 22a are alternately and complementarily caused to turn on and off, with a dead time period between the turning off of one switching device and the turning on of the other switching device. Tolerance of the dead time period varies with methods of designing switching power supply apparatuses, or working conditions of switching power supply apparatuses. The first switching unit 21 and the second switching unit 22 are connected in series between input terminals 12a and 12b. An input dc power supply 11 is connected between the input terminals 12a and 12b.

Likewise, a third switching unit 23 comprises a third switching device 23a, a diode 23b, and a capacitor 23c connected in parallel. The capacitor 23c is a parasitic capacitor having parasitic capacitance in the third switching device 23a and the diode 23b. A fourth switching unit 24 comprises a fourth switching device 24a, a diode 24b, and a capacitor 24c connected in parallel. The capacitor 24c is a parasitic capacitance in the fourth switching device 24a and the diode 24b.

The third switching device 23a and the fourth switching device 24a are controlled by control signals from the control circuit 71. The third switching device 23a and the fourth switching device 24a are alternately and complementarily caused to turn on and off, with a dead time period between the turning off of one switching device and the turning on of the other switching device. Tolerance of the dead time period varies with methods of designing switching power supply apparatuses, or working conditions of switching power supply apparatuses. The third switching unit 23 and the fourth switching unit 24 are connected in series between the input terminals 12a and 12b. The switching device in each switching unit is constructed of a controllable switching device such as an FET or IGBT.

The ON timing and OFF timing of the third switching device 23a are controlled so as to be displaced from the ON timing and OFF timing of the first switching device by a half cycle.

A transformer 31 has a primary winding 31a, a first secondary winding 31b, and a second secondary winding 31c. The turns ratio of the primary winding 31a, first secondary winding 31b, and second secondary winding 31c is n:1:1. A first terminal of the primary winding 31a is connected via a first inductor 41a to a connection point between the first switching unit 21 and the second switching unit 22. A second terminal of the primary winding 31a is connected via a second inductor 41b to a connection point between the third switching unit 23 and the fourth switching unit 24.

The first inductor 41a and the second inductor 41b are magnetically coupled together. The number of turns in the first inductor 41a is the same as that in the second inductor 41b, and the inductance value of each inductor is sufficiently smaller than the inductance value of the primary winding 31a of the transformer 31.

The cathode of a diode 51 is connected to the first terminal of the primary winding 31a of the transformer 31, and the anode of the diode 51 is connected to the input terminal 12b. On the other hand, the cathode of a diode 52 is connected to the second terminal of the primary winding 31a of the transformer 31, and the anode of the diode 52 is connected to the input terminal 12b.

The anode of a diode 61 is connected to a first terminal of the first secondary winding 31b of the transformer 31. The anode of a diode 62 is connected to a second terminal of the second secondary winding 31c of the transformer 31. A second terminal of the first secondary winding 31b of the transformer 31 is connected to the first terminal of the second secondary winding 31c.

The cathodes of the diodes 61 and 62 are connected together. A third inductor 63 and a smoothing capacitor 64 are connected in series between the connection point of the cathodes of the diodes 61 and 62 and the connection point connecting the second terminal of the first secondary winding 31b to the first terminal of the second secondary winding 31c.

Using the diodes 61, 62, the third inductor 63, and the smoothing capacitor 64, voltages developed across the first secondary winding 31b and second secondary winding 31c of the transformer 31 are rectified and smoothed to obtain a dc output voltage. A load 66 is connected between output terminals 65a and 65b.

The control circuit 71 detects the voltage appearing between the output terminals 65a and 65b, and generates control signals to control the switching operation of the first to fourth switching devices 21a, 22a, 23a, and 24a so that the dc output voltage is maintained at a constant level.

Next, the operation of the switching power supply apparatus according to the first embodiment will be described with reference to FIG. 2. The drawing of FIG. 2 is a waveform diagram for explaining the operation of the various parts of the switching power supply apparatus according to the first embodiment. In the waveform diagram of FIG. 2, times T0 to T8 are plotted on abscissa to indicate the variations of the operating condition of each part.

Figure 2:
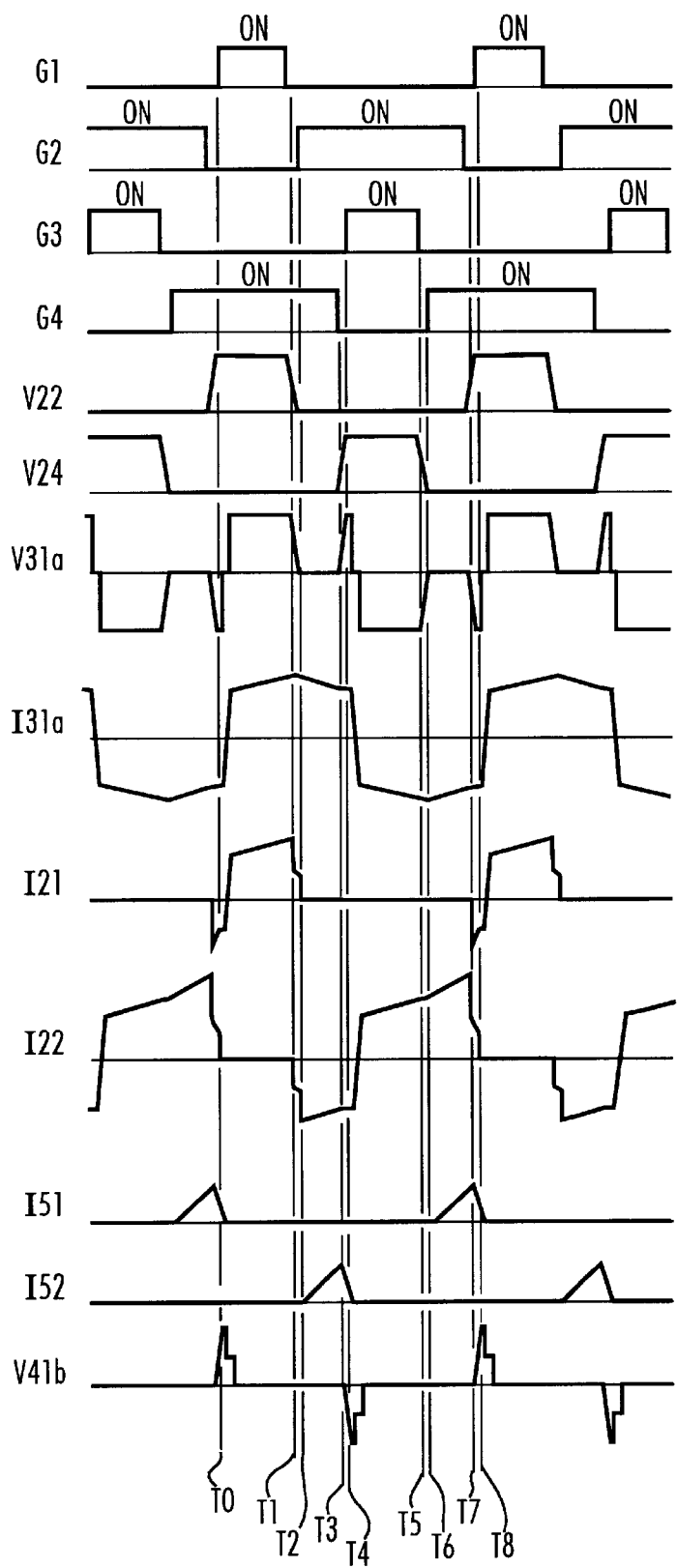
FIG. 2 is a waveform diagram illustrating the operation of each part of the switching power supply apparatus according to the first embodiment of the present invention.

In FIG. 2, G1, G2, G3, and G4 are the control signals supplied to the first to fourth switching devices 21a, 22a, 23a, and 24a, respectively.

In FIG. 2, V22 shows the voltage waveform applied to the second switching unit 22, V24 the voltage waveform applied to the fourth switching unit 24, and V31a the voltage waveform applied to the primary winding 31a of the transformer 31.

Further, in FIG. 2, I31a shows the waveform of the current flowing in the primary winding 31a of the transformer 31, I21 shows the waveform of the current flowing in the first switching unit 21, and I22 shows the waveform of the current flowing in the second switching unit 22. I51 shows the current flowing in the diode 51 and I52 the current flowing in the diode 52, while V41b shows the voltage waveform applied to the second inductor 41b.

At time T0, when the applied voltage to the first switching unit 21 reaches zero, the diode 21b is turned on. During the period when the diode 21b is ON, the first switching device 21a is turned on by the control signal GI from the control circuit 71. At this time, no significant difference is given in operation, the current flowing in the first switching unit 21 flows even either through the diode 21b or through the first switching device 21a.

The voltages V41a and V41b being applied to the first and second inductors 41a and 41b decrease from the input voltage Vin to zero through the already ON fourth switching device 24a, while the voltage V31a being applied to the primary winding 31a of the transformer 31 becomes the input voltage Vin. When the voltage V31a on the primary winding 31a of the transformer 31 becomes the input voltage Vin, the voltages V31b and V31c on the first secondary winding 31a and second secondary winding 31b of the transformer 31 both become a voltage Vin/n.

At this time, the diode 61 is turned on, and the diode 62 is turned off. Voltage V63 on the third inductor 63 then becomes a voltage Vin/n−Vout, and the current flowing in the third inductor 63 increases linearly. The current I31a flowing in the primary winding 31a of the transformer 31 is the sum of the magnetizing current in the transformer 31 and the primary side converted current of the current flowing in the third inductor 63. Therefore, it increases linearly. The primary side converted current is the component such that a current flowing in the third inductor 63 is converted into the current flowing through the primary winding 31a.

At this time, the control circuit 71 performs control so that the second switching device 22a is OFF, the third switching device 23a is OFF, and the fourth switching device 24a is ON. As a result, the diode 21b and the diode 24b are respectively short-circuited by the first switching device 21a and the fourth switching device 24a, respectively. The diodes 22b and 23b are reverse biased and are therefore OFF.

At time T1, when the fourth switching device 24a is in the ON state, the first switching device 21a is turned off by the control signal G1 from the control circuit 71. At this time, no abrupt changes occur in the current flowing in the primary winding 31a of the transformer 31 because of the influence of the current flowing in the third inductor 63.

As a result, the capacitors 21c and 22c are charged and discharged, respectively, and the voltage V22 applied to the second switching unit 22 decreases gradually. The control circuit 71 is set so as not to cause the second switching device 22a to turn on during the period immediately after the turning off of the first switching device 21a until it is detected that the applied voltage to the second switching unit 22 has reached zero.

At time T2, when the applied voltage to the second switching unit 22 reaches zero, the diode 22b is turned on. During the period when the diode 22b is ON, the second switching device 22a is turned on by the control signal G2 from the control circuit 71. At this time, no significant difference is given in operation, the current flowing in the second switching unit 22 flows even either through the diode 22b or through the second switching device 22a.

The series circuit consisting of the primary winding 31a of the transformer 31, the first inductor 41a, and the second inductor 41b is short-circuited through the diode 22b or the second switching device 22a which is turned on, and the fourth switching device 24a which was already turned on. This means that both ends of each of the primary winding 31a of the transformer 31, the first inductor 41a, and the second inductor 41b are short-circuited. Therefore, the sum of the energies stored in the first inductor 41a and second inductor 41b is maintained constant.

At this time, the voltages induced in the first secondary winding 31b and second secondary winding 31c of the transformer 31 both become zero. To describe more specifically, because of the influence of the ON voltage of each diode, the voltage V31b induced in the first secondary winding 31b of the transformer 31 is made slightly positive, while the voltage V31c induced in the second secondary winding 31c of the transformer 31 is made slightly negative. And the current in the secondary side of the transformer 31 flows through the first secondary winding 31b. The voltage V63 applied to the third inductor 63 becomes a voltage −Vout, and the current flowing therethrough decreases linearly.

A part (a) of FIG. 3 is a circuit diagram for explaining the variation of the current flowing in the second inductor 41b, etc. during the period starting at time T1 and ending at time T3 when the fourth switching device 24a is turned off. A part (b) of FIG. 3 is a waveform diagram showing the details of the currents flowing in the second inductor 41b and diode 52 during the period T1 to T3 in the circuit shown in the part (a) of FIG. 3.

When denoting the currents flowing in the coupled first and second inductors 41a and 41b by I41a and I41b, respectively, and the inductance value of each of the first and second inductors 41a and 41b by L41, then the sum E41 of the energies stored in the coupled first and second inductors 41a and 41b is expressed by following equation (4).

$$E41 = L41 \times (I41a + I41b)^2 / 2 \qquad (4)$$

During the period starting at time T1 when the first switching device 21a is turned off and ending at time T2 when the diode 22b is turned on with the applied voltage to the second switching unit 22 reaching zero, the same current flows in the first and second inductors 41a and 41b. During this period, the capacitors 22c and 21c contained in the second and first switching units 22 and 21 are discharged and charged, respectively.

When the charged voltage of the capacitor 22c decreases to zero, the diode 22b is turned on. The sum E411 of the energies stored in the first and second inductors 41a and 41b when the diode 22b is turned on is expressed as shown in equation (5) below, where IP denotes the current flowing in each of the first and second inductors 41a and 41b immediately before turning on of the diode 22b. When the diode 22b is ON, both ends of each of the first and second inductors 41a and 41b are short-circuited, as noted earlier. Accordingly, the sum E411 of the energies stored in the first and second inductors 41a and 41b is maintained constant.

$$E411 = L41 \times (IP \times 2)^2 / 2 \qquad (5)$$

When the diode 22b is ON, the current I31a flowing in the primary winding 31a of the transformer 31 is a primary side converted current of the current flowing in the third inductor 63. As a result, the current I31a decreases linearly. The current I41a flowing in the first inductor 41a is limited to the current I31a flowing in the primary winding 31a of the transformer 31. As the current I41b in the second inductor 41b, the current given by the following equation (6) flows so as to maintain the sum of the currents IP flowing in the first and second inductors 41a and 41b immediately before the diode 22b was turned on.

$$I41b = IP \times 2 - I31a \qquad (6)$$

With this current flow, the following relation (7) holds between the current I41a flowing in the first inductor 41a and the current I41b flowing in the second inductor 41b.

$$I41a + I41b = IP \times 2 \qquad (7)$$

Thus, the sum of the current I41a flowing in the first inductor 41a and the current I41b flowing in the second inductor 41b is maintained constant. As a result, the energy E411 is maintained at a constant value.

Accordingly, the current I41b flowing in the second inductor 41b and the current I52 flowing in the diode 52 contain the above-mentioned current components, as shown in the current waveform diagram of the part (b) of FIG. 3.

In the current waveform diagram (I41b) shown in the part (b) of FIG. 3, the region indicated by thin vertical lines represents the current component I31a flowing in the primary winding 31a of the transformer 31. The region indicated by thin oblique lines in the part (b) of FIG. 3 represents the current I52 flowing in the diode 52. That is, the current I52 is the current component equal to the current I41b flowing in the second inductor 41b minus the current I31a, and expressed by $$I52 = I41b - I31a = (IP \times 2 - I31a) - I31a = IP \times 2 - I31a \times 2 \qquad (8).$$

At time T3 shown in FIG. 2, when the fourth switching device 24a is turned off, the capacitor 23c and capacitor 24c are discharged and charged, respectively, by the energies held in the first inductor 41a and second inductor 41b.

As a result, the voltage applied to the third switching unit 23 decreases gradually. The control circuit 71 is set so as not to cause the third switching device 23a to turn on during the period immediately after the turning off of the fourth switching device 24a until it is detected that the applied voltage to the third switching unit 23 has reached zero.

At time T4, when the applied voltage to the third switching unit 23 reaches zero, the diode 23b is turned on. During the period when the diode 23b is ON, the third switching device 23a is turned on by the control signal G3 from the control circuit 71. At this time, no significant difference is given in operation, the current flowing in the third switching unit 23 flows even either through the diode 23b or through the third switching device 23a.

When the third switching device 23a is turned on, the voltages applied to the first inductor 41a and second inductor 41b decrease to zero by current flowing through the already ON second switching device 22a. And the voltage V31a being applied to the primary winding 31a of the transformer 31 becomes the voltage −Vin.

Thus, the voltage −Vin is applied as the voltage V31a to the primary winding 31a of the transformer 31, and the voltage V31b on the first secondary winding 31b and the voltage V31c on the second secondary winding 31c both become the voltage −Vin/n. As a result, the diode 61 is turned off, and the diode 62 is turned on. Accordingly, the voltage V63 on the third inductor 63 becomes the voltage Vin/n−Vout, and the current flowing in the third inductor 63 increases linearly.

The current I31a flowing in the primary winding 31a of the transformer 31 is the sum of the magnetizing current in the transformer 31 and the primary side converted current of the current flowing in the third inductor 63. Therefore, it increases linearly. As a result, magnetizing energy is stored in the third inductor 63.

At this time, the control circuit 71 performs control so that the first switching device 21a is OFF, the second switching device 22a is ON, and the fourth switching device 24a is OFF. As a result, the diode 22b and the diode 23b are respectively short-circuited by the second switching device 22a and the third switching device 23a, respectively, while the diodes 21b and 24b are reverse biased and are therefore OFF.

At time T5, when the second switching device 22a is in the ON state, the third switching device 23a is turned off by the control signal G3 from the control circuit 71. At this time, no abrupt changes due to influence of the current flowing in the third inductor 63 occur in the current I31a flowing in the primary winding 31a of the transformer 31. Accordingly, the capacitors 23c and 24c are charged and discharged, respectively, and the voltage V24 applied to the fourth switching unit 24 decreases gradually. The control circuit 71 is designed so as not to cause the fourth switching device 24a to turn on during the period immediately after the turning off of the third switching device 23a until it is detected that the applied voltage to the fourth switching unit 24 has reached zero.

At time T6, when the applied voltage to the fourth switching unit 24 reaches zero, the diode 24b is turned on. During the period when the diode 24b is ON, the fourth switching device 24a is turned on by the control signal G4 from the control circuit 71. At this time, no significant difference is given in operation, the current flowing in the fourth switching unit 24 flows even either through the diode 24b or through the fourth switching device 24a.

The series circuit consisting of the primary winding 31a of the transformer 31, the first inductor 41a, and the second inductor 41b is short-circuited through the diode 24b or the fourth switching device 24a, thus turned on, and the already ON second switching device 22a. This means that both ends of each of the primary winding 31a of the transformer 31, the first inductor 41a, and the second inductor 41b are short-circuited. Therefore, the sum of the energies stored in the first inductor 41a and second inductor 41b is maintained constant.

The operation from time T5 to time T7 when the second switching device 22a is turned off is the same as the previously described operation from time T1 to time T3.

The voltages V31b and V31c induced in the first secondary winding 31b and second secondary winding 31c of the transformer 31 both become zero, and the voltage V63 applied to the third inductor 63 becomes the voltage −Vout. Current flows in the second secondary winding 31c so that no discontinuity is caused in the magnetizing energy of the third inductor 63.

At time T7, when the second switching device 22a is turned off, the capacitor 21c and capacitor 22c are discharged and charged, respectively, by the energies held in the first inductor 41a and second inductor 41b. As a result, the voltage applied to the first switching unit 21 decreases gradually. The control circuit 71 is designed so as not to cause the first switching device 21a to turn on during the period immediately after the turning off of the second switching device 22a until it is detected that the applied voltage to the first switching unit 21 has reached zero.

At time T8, when the applied voltage to the first switching unit 21 reaches zero, the diode 21b is turned on. The circuit operation from time T8 is the same as that from time T0.

As described above, in the switching power supply apparatus of the first embodiment, the above-mentioned ON/OFF operations are repeated.

In the first embodiment, the period from time T1 to the time when the second switching device 22a is turned on, the period from time T3 to the time when the third switching device 23a is turned on, the period from time T5 to the time when the fourth switching device 24a is turned on, and the period from time T7 to the time when the first switching device 21a is turned on are ignored since these periods are short. The ON period of the first switching device 21a and the ON period of the third switching device 23a are both set equal to Ton.

The OFF period from the time when the first switching device 21a is turned off to the time when the third switching device 23a is turned on, and the OFF period from the time when the third switching device 23a is turned off to the time when the first switching device 21a is turned on, are both set equal to Toff. As can be seen from FIG. 2, in the first embodiment, the duty ratio of each of the first and third switching devices 21a and 23a is set below 50%.

If it is assumed that, in steady state operation, the magnetic flux of the third inductor 63 is in its initial state when the first switching device 21a is turned on, since the magnetic flux returns to its initial state in one cycle period from the turn-on of the first switching device 21a to the next turn-on thereof, the following relation (9) holds.

$$(V_{in}/n - V_{out}) \times T_{on} - V_{out} \times T_{off} = 0 \qquad (9)$$

Hence, the output voltage Vout is related to the input voltage Vin by following equation (10).

$$V_{out} = \delta \times V_{in}/n \qquad (10)$$

where δ in equation (10) is expressed by following equation (11).

$$\delta = T_{on}/(T_{on} + T_{off}) \qquad (11)$$

Accordingly, in the switching power supply apparatus of the first embodiment, the output voltage [Vout] can be controlled by adjusting the duty ratio of the first and third switching devices 21a and 23a. Therefore, the transformation equation of the switching power supply apparatus of the first embodiment is the same as that for the prior art full bridge converter.

In the switching power supply apparatus of the first embodiment, as noted earlier, the following factors are ignored: the period from time T1 to the time when the second switching device 22a is turned on; the period from time T3 to the time when the third switching device 23a is turned on; the period from time T5 to the time when the fourth switching device 24a is turned on; the period from time T7 to the time when the first switching device 21a is turned on; and the current flowing in the reverse direction immediately after the turn-on of each of the first to fourth switching devices 21a, 22a, 23a, and 24a.

Considering these and other factors ignored, the output voltage becomes lower than the value expressed by the equation (10). This decrease in the output voltage, however, can be easily compensated for by setting δ large. Accordingly, the predetermined output voltage can be obtained from the switching power supply apparatus of the first embodiment having the above-mentioned configuration.

The switching power supply apparatus of the first embodiment is configured so that the parasitic capacitors 21c, 22c, 23c, and 24c associated with the first to fourth switching devices 21a, 22a, 23a, and 24a, respectively, are discharged using the energy stored in the first and second inductors 41a and 41b, immediately before turning on of the respective switching devices. With this arrangement, the switching power supply apparatus of the first embodiment can drastically reduce the surge-like short-circuit current and can thus improve the efficiency and suppress the generation of noise.

Furthermore, in the switching power supply apparatus of the first embodiment, when there is a need to accommodate a light load, the inductance values of the first and second inductors 41a and 41b are made large to increase the energy to be stored in the respective inductors so that the parasitic capacitors of the respective switching unit can be fully charged and discharged. With this configuration, the switching power supply apparatus of the first embodiment can improve the efficiency and suppress the generation of noise even in light load applications.

The prior art has had the problem that an unwanted resonant voltage occurs when each of the first to fourth switching devices 121a, 122a, 123a, and 124a (see FIG. 6) is turned off, due to leakage inductance of the transformer or inductance parasitic on wiring. By contrast, in the switching power supply apparatus of the first embodiment, such resonant voltages are clamped by the diodes 22b, 21b, 24b, and 23b turning on when the respective switching devices are turned off.

Immediately after that, the second switching device 22a, the first switching device 21a, the fourth switching device 24a, or the third switching device 23a, connected in parallel to the associated diode, is turned on, thus maintaining the voltage clamping. Accordingly, unwanted resonant voltages do not occur in the switching power supply apparatus of the first embodiment.

Next, a full bridge converter will be considered. Japanese Unexamined Patent Publication No. 11-89232 discloses a switching power supply apparatus having an inductor added in series to the primary winding of a transformer. In the conventional switching power supply apparatus of such configuration, it is presumed that an unwanted resonant voltage occurs in association with a parasitic capacitor of the transformer at the connection point between the primary winding of the transformer and the added inductor, causing a resonant current to flow and thus causing noise.

By contrast, in the case of the switching power supply apparatus of the first embodiment, the current due to the energy stored in the first and second inductors 41a and 41b is split between the second switching unit 22 and the diode 52 or between the fourth switching unit 24 and the diode 51, and the voltage across both ends of the transformer is thus clamped substantially at zero, since the first and second inductors 41a and 41b are magnetically coupled. Accordingly, if a parasitic capacitance exists in the transformer 31, unwanted resonance with the first inductor 41a or the second inductor 41b does not occur.

In the switching power supply apparatus of the first embodiment, the period from the time when the first switching device 21a is turned off to the time when the second switching device 22a is turned on, the period from the time when the second switching device 22a is turned off to the time when the first switching device 21a is turned on, the period from the time when the third switching device 23a is turned off to the time when the fourth switching device 24a is turned on, and the period from the time when the fourth switching device 24a is turned off to the time when the third switching device 23a is turned on, have been set using a method of detecting the voltage applied to each of the first to fourth switching units.

However, the present invention is not limited to the using this particular method, but it will be recognized that other suitable methods may be employed, for example, each period may be set by detecting the current flowing in the diode connected in parallel with each of the first to fourth switching devices, or may be preset to a predetermined length of time.

Further, in the first embodiment, in addition to the parasitic capacitors 21c, 22c, 23c, and 24c connected in parallel with the first to fourth switching devices 21a, 22a, 23a, and 24a, an external capacitor may be added in order to further reduce the noise component by smoothing the voltage variation.

This addition does not cause any significant difference in basic operation from the first embodiment. The capacitors 21c, 22c, 23c, and 24c have been described as being parasitic capacitors having parasitic capacitance in the respective switching devices and diodes connected in parallel, but it will be appreciated that these capacitors can also be considered by including stray capacitors contained in the circuit pattern.

As described, according to the first embodiment, a switching power supply apparatus can be provided that achieves high efficiency and low noise performance over a wide load range.

Embodiment 2

A switching power supply apparatus according to a second embodiment of the present invention will be described with reference to FIGS. 4 and 5.

FIG. 4 is a circuit diagram showing the configuration of the switching power supply apparatus according to the second embodiment of the present invention. FIG. 5 is a waveform diagram for explaining the operation of the switching power supply apparatus according to the second embodiment. In the switching power supply apparatus of the second embodiment, parts identical in function and configuration to those in the foregoing first embodiment are designated by the same reference numerals, and explanatory descriptions of such parts will not be repeated here.

As shown in FIG. 4, the switching power supply apparatus of the second embodiment differs from the switching power supply apparatus of the first embodiment shown in FIG. 1 by the omission of the diodes 51 and 52 and the inclusion of diodes 53 and 54.

As shown in FIG. 4, in the second embodiment, the anode of the diode 53 is connected to the first terminal of the primary winding 31a of the transformer 31, and the cathode of the diode 53 is connected to the input terminal 12a. Likewise, the anode of the diode 54 is connected to the second terminal of the primary winding 31a of the transformer 31, and the cathode of the diode 54 is connected to the input terminal 12a.

In the waveform diagram of FIG. 5 for explaining the operation of the switching power supply apparatus of the second embodiment, explanatory descriptions will not be given of waveforms for the same circuit portions as those in the waveform diagram of the switching power supply apparatus of the first embodiment shown in FIG. 2.

In FIG. 5, I53 represents the waveform of the current flowing in the diode 53 and I54 represents the waveform of the current flowing in the diode 54.

In the switching power supply apparatus of the second embodiment shown in FIG. 4, the ON/OFF operation of the first switching unit 21 controlled by the control signal G1 output from the control circuit 71 is the same as the ON/OFF operation of the second switching unit 22 controlled by the control signal G2 output from the control circuit 71 in the switching power supply apparatus of the foregoing first embodiment.

Likewise, the ON/OFF operation of the second switching unit 22 controlled by the control signal G2 output from the control circuit 71 is the same as the ON/OFF operation of the first switching unit 21 controlled by the control signal G1 output from the control circuit 71 in the switching power supply apparatus of the foregoing first embodiment.

Further, the ON/OFF operation of the third switching unit 23 controlled by the control signal G3 output from the control circuit 71 is the same as the ON/OFF operation of the fourth switching unit 24 controlled by the control signal G4 output from the control circuit 71 in the switching power supply apparatus of the foregoing first embodiment. Likewise, the ON/OFF operation of the fourth switching unit 24 controlled by the control signal G4 output from the control circuit 71 is the same as the ON/OFF operation of the third switching unit 23 controlled by the control signal G3 output from the control circuit 71 in the switching power supply apparatus of the foregoing first embodiment.

The operation of the diodes 53 and 54 in the second embodiment is the same as the operation of the diodes 51 and 52 in the switching power supply apparatus of the first embodiment. The operation of the transformer 31 and diodes 61 and 62 in the second embodiment is the same as the operation of the transformer 31 and diodes 61 and 62 in the switching power supply apparatus of the first embodiment, except that the voltage and current phases in the second embodiment are 180° reversed from those in the first embodiment. The operation of other circuit portions of the switching power supply apparatus of the second embodiment is the same as the corresponding portions in the foregoing first embodiment.

The output voltage in the second embodiment will be discussed below.

In the switching power supply apparatus of the second embodiment, the following periods are ignored since these periods are short: the period from time T1 to the time when the first switching device 21a is turned on, the period from time T3 to the time when the fourth switching device 24a is turned on, the period from time T5 to the time when the third switching device 23a is turned on, and the period from time T7 to the time when the second switching device 22a is turned on.

The ON period of the second switching device 22a and the ON period of the fourth switching device 24a are both set equal to Ton. The OFF period from the time when the second switching device 22a is turned off to the time when the fourth switching device 24a is turned on, and the OFF period from the time when the fourth switching device 24a is turned off to the time when the second switching device 22a is turned on, are both set equal to Toff.

As shown in FIG. 5, in the second embodiment, the duty ratio of each of the second and fourth switching devices 22a and 24a is set below 50%. Further, the relationship between the output voltage and input voltage in the second embodiment is the same as that shown by the equation (10) for the output voltage Vout and the input voltage Vin in the foregoing first embodiment.

Next, a brief description will be given of the reason why the diodes 53 and 54 in the second embodiment are connected, unlike the diodes 51 and 52 in the first embodiment, to the input terminal 12a which connects the positive terminal of the input dc power supply to the two terminals of the transformer 31.

In the first embodiment, as shown in FIG. 3, there exists a period during which the second switching unit 22 and fourth switching unit 24 connected to the input terminal 12b are both ON. During that period, the second switching unit 22, the inductor 41a, the primary winding 31a of the transformer 31, the inductor 41b coupled with the inductor 41a, and the fourth switching unit 24 together form a loop. The current flowing through this loop is limited by the current flowing in the primary winding 31a of the transformer 31.

In order to maintain the energy held in the coupled inductors 41a and 41b, in the current flowing through the inductors 41a and 41b, a portion that exceeds the current flowing in the primary winding 31a of the transformer 31 is made to flow by short-circuiting both ends of the inductor 41a or 41b. Accordingly, in the first embodiment, the diodes 51 and 52 are inserted between the input terminal 12b and the respective terminals of the inductors 41a and 41b to accomplish the required function.

On the other hand, in the second embodiment, there exists a period during which the first switching unit 21 and third switching unit 23 connected to the input terminal 12a are both ON. During that period, the first switching unit 21, the inductor 41a, the primary winding 31a of the transformer 31, the inductor 41b coupled with the inductor 41a, and the third switching unit 23 together form a loop.

The current flowing through this loop is limited by the current flowing in the primary winding 31a of the transformer 31. In the current flowing through the inductors 41a and 41b to maintain the energy held in the coupled inductors 41a and 41b, the portion that exceeds the current flowing in the primary winding 31a of the transformer 31 is made to flow by short circuiting both ends of the inductor 41a or 41b. To accomplish this, short-circuiting means must be provided between the input terminal 12a and the respective terminals of the inductors 41a and 41b. In the second embodiment, the diodes 53 and 54 are inserted as the short-circuiting means.

In the switching power supply apparatus of the second embodiment, as in the switching power supply apparatus of the first embodiment, the parasitic capacitors 21c, 22c, 23c, and 24c having parasitic capacitance in the first to fourth switching devices 21a, 22a, 23a, and 24a, respectively, are discharged using the energy stored in the first and second inductors 41a and 41b, immediately before turning on of the respective switching devices. With this arrangement, the surge-like short-circuit current can be drastically reduced, and the efficiency can be improved, while suppressing the generation of noise.

Further, in the switching power supply apparatus of the second embodiment, when there is a need to accommodate a light load, the inductance values of the first and second inductors 41a and 41b can be set large to increase the energy to be stored in the respective inductors. As a result, the parasitic capacitors of the respective switching unit can be fully charged and discharged. With this configuration, the switching power supply apparatus of the second embodiment can improve the efficiency and suppress the generation of noise even in light load applications.

Furthermore, in the switching power supply apparatus of the second embodiment, provisions are made to prevent the occurrence of an unwanted resonant voltage due to leakage inductance of the transformer or inductance parasitic on wiring.

Next, a full bridge converter will be considered. Japanese Unexamined Patent Publication No. 11-89232 discloses a switching power supply apparatus having an inductor added in series to the primary winding of a transformer. In the switching power supply apparatus of such configuration, it is presumed that an unwanted resonant voltage occurs in association with a parasitic capacitor of the transformer at the connection point between the primary winding of the transformer and the added inductor, causing a resonant current to flow and thus causing noise.

By contrast, in the case of the switching power supply apparatus of the second embodiment, the current due to the energy stored in the first and second inductors 41a and 41b is split between the first switching unit 21 and the diode 54 or between the third switching unit 23 and the diode 53. And the voltage across both ends of the transformer is thus clamped substantially at zero. Accordingly, if a parasitic capacitor exists on the transformer 31, unwanted resonance with the first inductor 41a or the second inductor 41b does not occur.

In the switching power supply of the second embodiment, following periods have been set using a method of detecting the voltage applied to each of the first to fourth switching units, as in the first embodiment: the period from the time when the first switching device 21a is turned off to the time when the second switching device 22a is turned on; the period from the time when the second switching device 22a is turned off to the time when the first switching device 21*a* is turned on; the period from the time when the third switching device 23*a* is turned off to the time when the fourth switching device 24*a* is turned on; and the period from the time when the fourth switching device 24*a* is turned off to the time when the third switching device 23*a* is turned on.

However, the present invention is not limited to using this particular method, but it will be recognized that other suitable methods may be employed, for example, each period may be set by detecting the current flowing in the diode connected in parallel with each of the first to fourth switching devices, or may be preset to a predetermined length of time.

Further, in the second embodiment, in addition to the parasitic capacitors 21*c*, 22*c*, 23*c*, and 24*c* connected in parallel with the first to fourth switching devices 21*a*, 22*a*, 23*a*, and 24*a*, an external capacitor may be added in order to further reduce the noise component by smoothing the voltage variation. This addition does not cause any significant difference in basic operation from the first embodiment.

The capacitors 21*c*, 22*c*, 23*c*, and 24*c* have been described as being parasitic capacitors having parasitic capacitance in the respective switching devices and diodes connected in parallel, but it will be appreciated that these capacitors can also be considered by including stray capacitors contained in the circuit pattern.

As described, according to the second embodiment, a switching power supply apparatus can be provided that achieves high efficiency and low noise performance over a wide load range.

As is apparent from the above-mentioned detailed description of the specific embodiments, the present invention offers the following effects.

The switching power supply apparatus of the present invention is configured so that the parasitic capacitors in the first to fourth switching units are charged and discharged using the energy stored in the first and second inductors, immediately before the respective switching units are turned on. With this configuration, according to the present invention, a switching power supply apparatus can be obtained that achieves improved efficiency and noise suppression by preventing the occurrence of a surge-like short-circuit current or by reducing the short-circuit current.

Further, in the switching power supply apparatus of the present invention, efficiency can be improved and noise suppressed over a wide load range by setting the inductance values of the first and second inductors large.

Furthermore, in the switching power supply apparatus of the present invention, when the first to fourth switching devices are respectively turned off, the diode connected in parallel with the second, the first, the fourth, or the third switching device, respectively, is turned on to clamp the resonant voltage. Immediately after that, in the power supply apparatus of the present invention, the second, the first, the fourth, or the third switching device, respectively, connected in parallel with that diode, is turned on, thereby maintaining the voltage clamping and preventing the occurrence of a resonant voltage.

In the switching power supply apparatus of the present invention, the current due to the energy stored in the first and second inductors flows through the second switching device and second diode and the fourth switching device and first diode, since the first and second inductors are magnetically coupled.

According to this configuration of the present invention, unwanted resonance between a parasitic capacitor in the transformer and the first and second inductors does not occur, and a switching power supply apparatus capable of achieving high efficiency and low noise performance over a wide load range can be realized.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above-mentioned disclosure.

Accordingly, it is intended that the appended claims be interpreted as covering all alterations and modifications as fall within the true spirit and scope of the invention.

What is claimed is:

1. A switching power supply apparatus comprising:
   a first series circuit connected to an input dc power supply and having a first switching means and a second switching means which alternately turn on and off with a dead time period between the turning off of one switching means and the turning on of the other switching means;
   a second series circuit connected to said input dc power supply and having a third switching means and a fourth switching means which alternately turn on and off with a dead time period between the turning off of one switching means and the turning on of the other switching means;
   a transformer having at least a primary winding and a secondary winding;
   a first inductor connected between a first terminal of the primary winding of said transformer and a connection point at which said first switching means and said second switching means are connected;
   a second inductor magnetically coupled with said first inductor and connected between a second terminal of the primary winding of said transformer and a connection point at which said third switching means and said fourth switching means are connected;
   wherein said first inductor is connected in series with said primary winding, and said primary winding is in turn connected in series with said second inductor;
   a first diode connected between the first terminal of the primary winding of said transformer and a negative terminal of said input dc power supply;
   a second diode connected between the second terminal of the primary winding of said transformer and a negative terminal of said input dc power supply;
   rectifying and smoothing means for rectifying and smoothing a voltage induced in the secondary winding of said transformer; and
   ON/OFF control means for controlling either the duty ratio of a controllable switching device contained in said first switching means or the duty ratio of a controllable switching device contained in said third switching means, or both of said ratios.

2. A switching power supply apparatus according to claim 1, wherein for said controllable switching device contained in each of said first switching means and said third switching means, the duty ratio of said controllable switching device is set below 50%.

3. A switching power supply apparatus according to claim 1, wherein the controllable switching devices respectively contained in said first switching means, said second switching means, said third switching means, and said fourth switching means are termed a first switching device, a second switching device, a third switching device, and a fourth switching device, respectively, and a control means is included by which a period from the time when said first switching device changes from ON to OFF to the time when said second switching device changes from OFF to ON, a period from the time when said second switching device changes from ON to OFF to the time when said first switching device changes from OFF to ON, a period from the time when said third switching device changes from ON to OFF to the time when said fourth switching device changes from OFF to ON, and a period from the time when said fourth switching device changes from ON to OFF to the time when said third switching device changes from OFF to ON are each fixed to a predetermined length of time.

4. A switching power supply apparatus according to claim 1, wherein said first switching means, said second switching means, said third switching means, and said fourth switching means are each constructed of an FET alone which is a controllable switching device containing a diode in parallel, and wherein said first switching means, said second switching means, said third switching means, and said fourth switching means each include a control means for causing said switching device to turn on by detecting a current having flown through said diode.

5. A switching power supply apparatus according to claim 1, wherein a pulse for turning on and off said first switching means and a pulse for turning on and off said third switching means are controlled so that one pulse is shifted 180° in phase with respect to the other pulse.

6. A switching power supply apparatus according to claim 1, wherein said first switching means, said second switching means, said third switching means, and said fourth switching means are each constructed of a parallel connection consisting of a controllable switching device and a diode.

7. A switching power supply apparatus according to claim 1, wherein said first switching means, said second switching means, said third switching means, and said fourth switching means are each constructed of an FET alone which is a controllable switching device containing a diode in parallel.

8. A switching power supply apparatus according to claim 1, wherein said first switching means, said second switching means, said third switching means, and said fourth switching means are each constructed of a parallel connection consisting of a controllable switching device and a diode, and wherein said first switching means, said second switching means, said third switching means, and said fourth switching means each include a control means for detecting an applied voltage and for causing said switching device to turn on when said detected applied voltage is substantially zero.

9. A switching power supply apparatus according to claim 1, wherein said first switching means, said second switching means, said third switching means, and said fourth switching means are each constructed of an FET alone which is a controllable switching device containing a diode in parallel, and wherein said first switching means, said second switching means, said third switching means, and said fourth switching means each include a control means for detecting an applied voltage and for causing said switching device to turn on when said detected applied voltage is substantially zero.

10. A switching power supply apparatus according to claim 1, wherein said first switching means, said second switching means, said third switching means, and said fourth switching means are each constructed of a parallel connection consisting of a controllable switching device and a diode, and wherein said first switching means, said second switching means, said third switching means, and said fourth switching means each include a control means for causing said switching device to turn on by detecting a current having flown through said diode.

11. A switching power supply apparatus comprising:

a first series connected to an input dc power supply and having a first switching means and a second switching means which alternately turn on and off with a dead time period between the turning off of one switching means and the turning on of the other switching means;

a second series circuit connected to said input dc power supply and having a third switching means and a fourth switching means which alternately turn on and off with a dead time period between the turning off of one switching means and the turning on of the other switching means;

a transformer having at least a primary winding and a secondary winding;

a first inductor connected between a first terminal of the primary winding of said transformer and a connection point at which said first switching means and said second switching means are connected;

a second inductor magnetically coupled with said first inductor and connected between a second terminal of the primary winding of said transformer and a connection point at which said third switching means and said fourth switching means are connected;

wherein said first inductor is connected in series with said primary winding, and said primary winding is in turn connected in series with said second inductor;

a first diode connected between the first terminal of the primary winding of said transformer and a positive terminal of said input do supply;

a second diode connected between the second terminal of the primary winding of said transformer and a positive terminal of said input do supply;

rectifying and smoothing,means for rectifying and smoothing a voltage induced in the secondary winding of said transformer: and ON/OFF control means for controlling either the duty ratio of a controllable switching device contained in said first switching means or the duty ratio of a controllable switching device contained in said third switching means, or both of said ratios.

12. A switching power supply apparatus according to claim 11, wherein for said controllable switching device contained in each of said second switching means and said fourth switching means, the duty ratio of said controllable switching device is set below 50%.

13. A switching power supply apparatus according to claim 11, wherein a pulse for turning on and off said first switching means and a pulse for turning on and off said third switching means are controlled so that one pulse is shifted 180° in phase with respect to the other pulse.

14. A switching power supply apparatus according to claim 11, wherein said first switching means, said second switching means, said third switching means, and said fourth switching means are each constructed of a parallel connection consisting of a controllable switching device and a diode.

15. A switching power supply apparatus according to claim 11, wherein said first switching means, said second switching means, said third switching means, and said fourth switching means are each constructed of an FET alone which is a controllable switching device containing a diode in parallel.

16. A switching power supply apparatus according to claim 11, wherein said first switching means, said second switching means, said third switching means, and said fourth switching means are each constructed of a parallel connection consisting of a controllable switching device and a diode, and wherein said first switching means, said second switching means, said third switching means, and said fourth switching means each include a control means for detecting an applied voltage and for causing said switching device to turn on when said detected applied voltage is substantially zero.

17. A switching power supply apparatus according to claim 11, wherein said first switching means, said second switching means, said third switching means, and said fourth switching means are each constructed of an FET alone which is a controllable switching device containing a diode in parallel, and wherein said first switching means, said second switching means, said third switching means, and said fourth switching means each include a control means for detecting an applied voltage and for causing said switching device to turn on when said detected applied voltage is substantially zero.

18. A switching power supply apparatus according to claim 11, wherein said first switching means, said second switching means, said third switching means, and said fourth switching means are each constructed of a parallel connection consisting of a controllable switching device and a diode, and wherein said first switching means, said second switching means, said third switching means, and said fourth switching means each include a control means for causing said switching device to turn on by detecting a current having flown through said diode.

19. A switching power supply apparatus according to claim 11, wherein said first switching means, said second switching means, said third switching means, and said fourth switching means are each constructed of an FET alone which is a controllable switching device containing a diode in parallel, and wherein said first switching means, said second switching means, said third switching means, and said fourth switching means each include a control means for causing said switching device to turn on by detecting a current having flown through said diode.

20. A switching power supply apparatus according to claim 11, wherein the controllable switching devices respectively contained in said first switching means, said second switching means, said third switching means, and said fourth switching means are termed a first switching device, a second switching device, a third switching device, and a fourth switching device, respectively, and a control means is included by which a period from the time when said first switching device changes from ON to OFF to the time when said second switching device changes from OFF to ON, a period from the time when said second switching device changes from ON to OFF to the time when said first switching device changes from OFF to ON, a period from the time when said third switching device changes from ON to OFF to the time when said fourth switching device changes from OFF to ON, and a period from the time when said fourth switching device changes from ON to OFF to the time when said third switching device changes from OFF to ON are each fixed to a predetermined length of time.

21. A method for outputting a output DC voltage from an input dc power supply comprising:

providing a first series circuit having a first switch and a second switch, a second series circuit having a third switch and a fourth switch, a transformer having at least a primary winding and a secondary winding, a first inductor connected between a connection point between said first switch and said second switch and a first terminal of said primary winding, a second inductor magnetically coupled with said first inductor and connected between a connection point between said third switch and said fourth switch and a second terminal of said primary winding, a first diode connected between the first terminal of the primary winding and a negative terminal of said dc power supply, and a second diode connected between the second terminal of the primary winding and the negative terminal of said dc power supply;

applying an input signal from said input dc power supply to said first and second series circuits;

activating said first switch and said second switch to alternately turn on and off, and activating said third switch and said fourth switch to alternately turn on and off;

maintaining a substantially constant energy level in said first and second inductors during at least a portion of said activating step;

rectifying a voltage induced on said secondary winding of said transformer to form a rectified signal; and smoothing said rectified signal to form the output DC voltage.

22. A switching power supply apparatus comprising:

a first series circuit connected to an input dc power supply and having a first switch and a second switch which alternately turn on and off;

a second series circuit connected to said input dc power supply and having a third switch and a fourth switch which alternately turn on and off;

a transformer having at least a primary winding and a first secondary winding and a second secondary winding;

a first inductor connected between a first terminal of the primary winding of said transformer and a connection point at which said first switch and said second switch are connected;

a second inductor magnetically coupled with said first inductor and connected between a second terminal of the primary winding of said transformer and a connection point at which said third switch and said fourth switch are connected;

a first diode connected between the first terminal of the primary winding of said transformer and a negative terminal of said input dc power supply;

a second diode connected between the second terminal of the primary winding of said transformer and a negative terminal of said input dc power supply;

a third diode connected between a first terminal of said first secondary winding and a first terminal of a third inductor;

a fourth diode connected between a first terminal of said second secondary winding and said first terminal of said third inductor;

a capacitor connected between a second terminal of said third inductor and a second terminal of said first and second secondary windings; and an ON/OFF controller connected to a controllable switching device contained in said first switch or a controllable switching device contained in said third switch, which controls a duty ratio of said controllable switching device.

* * * * *